A. R. PRITCHARD.
LANTERN.
APPLICATION FILED DEC. 20, 1910.

999,465. Patented Aug. 1, 1911.

Witnesses:
Clarence W. Carroll
L. Thow

Inventor:
Albert R. Pritchard
Attorneys:
Osgood, Davis & Dorsey
by Farnum F. Dorsey

UNITED STATES PATENT OFFICE.

ALBERT R. PRITCHARD, OF ROCHESTER, NEW YORK.

LANTERN.

999,465.     Specification of Letters Patent.     Patented Aug. 1, 1911.

Application filed December 20, 1910. Serial No. 598,359.

*To all whom it may concern:*

Be it known that I, ALBERT R. PRITCHARD, a citizen of the United States, and resident of Rochester, in the county of Monroe and State of New York, have invented certain new and useful Improvements in Lanterns, of which the following is a specification.

This invention relates to lanterns of the type adapted for use as side-lamps on wagons or other vehicles.

The object of the invention is to produce a lantern having a simple, compact and rigid construction by which it is adapted to be readily secured upon, and removed from, either the side of the vehicle-body itself, or a bracket permanently secured to the vehicle, as convenience may require, and to this end the invention consists in the construction hereinafter specifically described, as it is defined in the succeeding claims.

Figure 1:
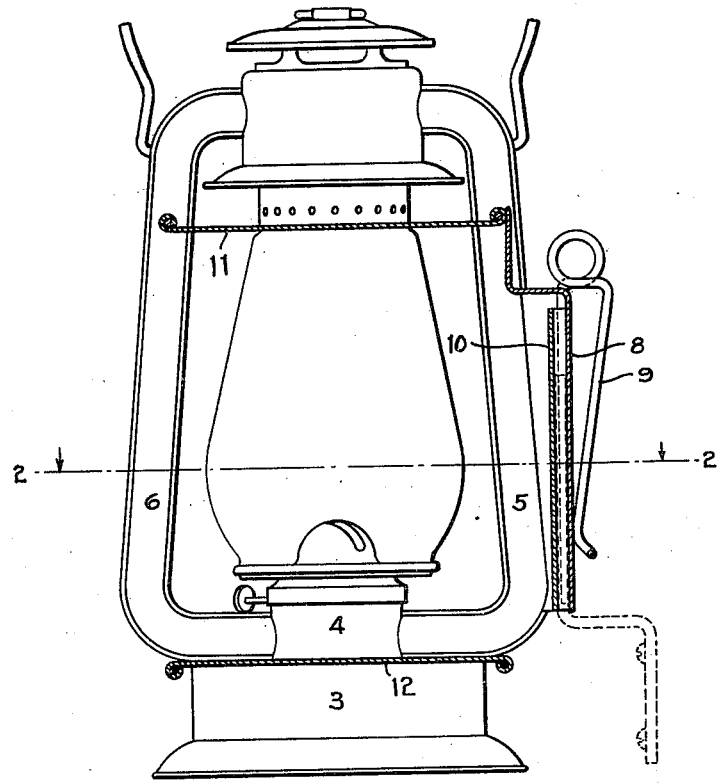
Figure 2:
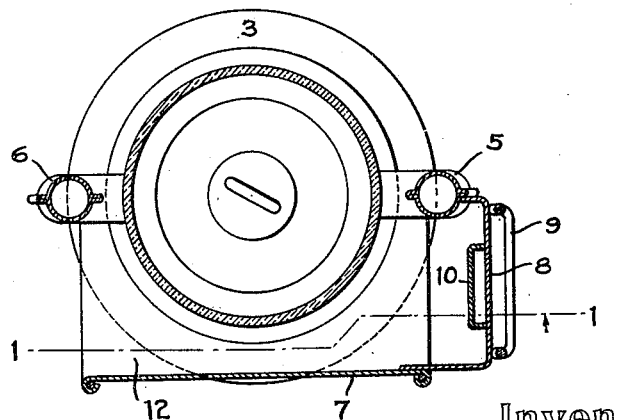

In the drawings:—Figure 1 is a rear-elevation of a lantern embodying the present invention, showing parts in section on the line 1—1 in Fig. 2; and Fig. 2 is a horizontal section on the line 2—2 in Fig. 1.

The precise construction of the lantern proper is immaterial, but in the drawings a lantern of ordinary tubular form is shown comprising an oil-font 3, a burner 4, and air-tubes 5 and 6. The lantern is shielded at the rear by means of a vertical metal plate or shield 7 having forwardly-bent upper and lower ends 11 and 12. The shield is secured to the oil-font and the air-tubes, and at one side of the lantern a sheet-metal base-plate 8 is secured in vertical position, this plate serving both to mask the light in the direction of the driver of the vehicle, and as means for securing the lantern in position upon the vehicle. The base-plate 8 is secured, at its upper extremity, to the upper end 11 of the shield, and, at its rear edge, to the body of the shield, and the forward edge of the base-plate is secured to the air-tube 5, preferably by means of solder. The base-plate is thus very rigidly supported so that it will securely withstand the jars to which the lantern is subjected when in use.

When the lantern is to be secured directly upon the side of the body of a wagon or other vehicle, this is done by clamping the outer surface of the base-plate 8 against the side, a spring 9 being used for this purpose. This spring has a depending U-shaped portion and upper coiled portions, as shown in Fig. 1, and its inner extremities are soldered or otherwise secured, to the rear of the base-plate 8. When the lantern, on the other hand, is to be mounted upon a bracket extending from the body of the vehicle, this is done by means of a socket which is formed by soldering, or otherwise securing, a channel-shaped sheet-metal member 10 to the inner surface of the base-plate 8, in vertical position. This socket is open at the bottom so that it may be slipped over the end of a bracket formed as shown in dotted lines in Fig. 1, and may be readily removed therefrom when the lantern is not to be used.

In the arrangement of parts just described the base-plate 8 constitutes an element of both devices for securing the lantern to the vehicle, and a compact, rigid and inexpensive construction is thus produced.

I claim:—

1. A lantern provided with a base-plate fixed in vertical position at one side thereof, means for clamping the outer surface of said base-plate removably against the side of a vehicle-body, and means for fixing the inner surface of the base-plate against a bracket.

2. A tubular lantern provided with a back-plate or shield, a vertical base-plate, at the side of the lantern, secured to the back-plate and to an air-tube of the lantern, a spring-clip for securing the outer surface of the base-plate against a vehicle-body, and a socket-member secured in vertical position to the inner surface of the base-plate and open at the bottom to receive a bracket.

ALBERT R. PRITCHARD.

Witnesses:
   D. GURNEE,
   L. THON.

Copies of this patent may be obtained for five cents each, by addressing the "Commissioner of Patents, Washington, D. C."